United States Patent
Chabrand et al.

(10) Patent No.: US 6,887,957 B2
(45) Date of Patent: May 3, 2005

(54) PROCESS FOR THE GAS-PHASE (CO-)POLYMERIZATION OF OLEFINS IN A FLUIDIZED BED REACTOR

(75) Inventors: Christine Chabrand, Carry le Rouet (FR); Muriel Esteban, Lavera (FR); Caroline Mladenov, Martigues (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 10/398,161

(22) PCT Filed: Sep. 28, 2001

(86) PCT No.: PCT/GB01/04333

§ 371 (c)(1),
(2), (4) Date: Sep. 17, 2003

(87) PCT Pub. No.: WO02/28919

PCT Pub. Date: Apr. 11, 2002

(65) Prior Publication Data

US 2004/0054099 A1 Mar. 18, 2004

(30) Foreign Application Priority Data

Oct. 5, 2000 (EP) ............................................. 00430029

(51) Int. Cl.$^7$ .................................................. C08F 2/34

(52) U.S. Cl. .................... 526/144; 526/348; 526/348.2; 526/348.4; 526/348.5; 526/348.6; 526/901

(58) Field of Search ................................. 526/144, 901, 526/348, 348.2, 348.4, 348.5, 348.6

(56) References Cited

U.S. PATENT DOCUMENTS 4,435,520 A    3/1984   Aylward

FOREIGN PATENT DOCUMENTS

| EP | 0 164 215 | 12/1985 |
| EP | 0 529 977 A1 | 3/1993 |
| EP | 0 703 246 A1 | 3/1996 |
| WO | WO 89/01496 | 2/1989 |
| WO | 0 614 917 A1 | 9/1994 |
| WO | WO 00/39174 | 7/2000 |

*Primary Examiner*—Fred Teskin
(74) *Attorney, Agent, or Firm*—Finnegan, Henderson, Farabow, Garrett and Dunner, L.L.P.

(57) ABSTRACT

A process for the gas-phase (co-)polymerization of olefins in a fluidised bed reactor using a Ziegler-Natta type catalyst characterised in that the polymerisation is performed in the presence of an additive having the formula R—Cl where R is an alkyl group of 2 to 7 carbon atoms.

7 Claims, No Drawings

PROCESS FOR THE GAS-PHASE (CO-) POLYMERIZATION OF OLEFINS IN A FLUIDIZED BED REACTOR

BACKGROUND OF THE INVENTION

The present invention relates to a process for the (co-) polymerisation of olefins using a Ziegler-Natta type catalyst, in particular to a process for the gas-phase (co-) polymerisation of olefins in a fluidised bed reactor using a Ziegler-Natta type catalyst The present invention also relates to a process for increasing the polymerisation activity of a Ziegler-Natta type catalyst during the (co-)polymerisation of olefins using said Ziegler-Natta type catalyst, in particular during the gas-phase (co-)polymerisation of olefins in a fluidised bed reactor using said Ziegler-Natta type catalyst The present invention further relates to a process for increasing the comonomer response during the copolymerisation of olefins using a Ziegler-Natta type catalyst in particular during the gas-phase copolymerisation of olefins in a fluidised bed reactor using a Ziegler-Natta type catalyst Processes for the co-polymerisation of olefins in the gas phase are well known in the art. Such processes can be conducted for example by introducing the gaseous monomer and comonomer into a stirred and/or fluidised bed comprising polyolefin and a catalyst for polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst would become inactive or the bed would begin to melt. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerizing alpha olefins, the recycle gas generally comprises the monomer and comonomer olefins, optionally together with, for example, an inert diluent gas such as nitrogen or a gaseous chain transfer agent such as hydrogen. Thus, the recycle gas is used to supply the monomer to the bed, to fluidise the bed, and to maintain the bed at the desired temperature. Monomers consumed by the polymerisation reaction are normally replaced by adding make up gas or liquid to the polymerisation zone or reaction loop.

It is well known that Ziegler-Natta type catalysts can advantageously be used for the (co-)polymerisation of olefins, particularly in slurry processes as well as in gas phase processes.

In the course of their research developments, the applicants have now found a new method for increasing up to an unexpected level the polymerisation activity of a Ziegler-Natta type catalyst during the (co-)polymerisation of olefins using said Ziegler-Natta type catalyst, in particular during the gas-phase (co-)polymerisation of olefins in a fluidised bed reactor using said Ziegler-Natta type catalyst, especially during the gas-phase (co-)polymerisation of ethylene in a fluidised bed reactor using said Ziegler-Natta type catalyst. What is also unexpected from these huge activity increases is that the present method is absolutely not detrimental and rather beneficial to a normal and efficient process behaviour of industrial plants; in this respect, the Applicants have found that their method can be successfully applied for increasing plant throughput while avoiding the usual fouling problems the man skilled in the art would expect to face at these high activities.

Simultaneously, the applicants have found that this new method allows to increase the comonomer response during the copolymerisation of olefins using a Ziegler-Natta type catalyst, in particular during the gas-phase copolymerisation of olefins in a fluidised bed reactor using a Ziegler-Natta type catalyst, especially during the gas-phase copolymerisation of ethylene with another olefin in a fluidised bed reactor using said Ziegler-Natta type catalyst This method is especially valuable for the industrial plants which will be now able by keeping their actual Ziegler-Natta type catalyst to increase significantly their polymer production.

SUMMARY OF THE INVENTION

In accordance with the present invention, there has now been found a process for the gas-phase (co-)polymerisation of olefins in a fluidised bed reactor using a Ziegler-Natta type catalyst said process being performed in the presence of an additive having the formula R—Cl wherein R is an alkyl group having from 2 to 7 carbon atoms.

DETAILED DESCRIPTION OF THE INVENTION

The additive can be added at any location of the fluidised bed polymerisation system, e.g. in the reactor itself, below the fluidisation grid or above the grid in the fluidised bed, above the fluidised bed, in the powder disengagement zone of the reactor (also named velocity reduction zone), anywhere in the reaction loop or recycle line, in the fines recycle line (when a cyclone is used). According to an embodiment of the present invention, the additive is added directly into the fines recycle line (when a cyclone is used), or directly into the polymerisation zone, more preferably directly into the fluidised bed, ideally in the lower part of the bed (below half bed height). For the purposes of the present invention and appended claims, the polymerisation zone means the reaction zone consisting of the fluidised bed itself, and in the region above the fluidised bed which consists of the powder disengagement zone and/or the velocity reduction zone. According to another embodiment of the present invention, the additive is added at at least two different locations of the fluidised bed polymerisation system. It is preferred according to the present invention that the additive is not added in admixture with the catalyst. According to another embodiment, the additive is added into the fluidised bed polymerisation system through the well known BP high productivity nozzles which protrude through the fluidisation grid directly into the fluidised bed (see e.g. WO9428032, the content of which is incorporated hereby).

According to the present invention, the additive has the formula R—Cl wherein R is an alkyl group having from 2 to 7 carbon atoms. Preferably, the additive is chosen amongst ethyl chloride, propyl chloride, butyl chloride, pentyl chloride, hexyl chloride and heptyl chloride. Butyl chlorides are more preferred, n-butyl chloride being the most preferred additive.

According to a preferred embodiment of the present invention, the invention additive is diluted in a conventional diluent Suitable diluents include aromatic, paraffin and cycloparaffin compounds. The diluents are preferably selected from among benzene, toluene, xylene, cyclohexane, fuel oil, isobutane, pentane, kerosene and mixtures thereof for instance. When a diluent is used, the invention additive is preferably present in an amount comprised between 0.001 and 2 mole/l of diluent, preferably between 0.005 and 1 mole/l of diluent. Said diluent is preferably butane, pentane or hexane.

The process according to the present invention is particularly suitable for the manufacture of polymers in a continuous gas fluidised bed process.

In an advantageous embodiment of this invention, the polymer is a polyolefin preferably copolymers of ethylene and/or propylene and/or butene. Preferred alpha-olefins used in combination with ethylene and/or propylene and/or butene in the process of the present invention are those having from 4 to 8 carbon atoms. However, small quantities of alpha olefins having more than 8 carbon atoms, for example 9 to 40 carbon atoms (e.g. a conjugated diene), can be employed if desired Thus it is possible to produce copolymers of ethylene and/or propylene and/or butene with one or more C4–C8 alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the C4–C8 monomer are dec-1-ene and ethylidene norbornene. According to a preferred embodiment, the process of the present invention preferably applies to the manufacture of polyolefins in the gas phase by the copolymerisation of ethylene with but-1-ene and/or hex-1-ene and/or 4-methylpent-1-ene. The process according to the present invention may particularly be used to prepare a wide variety of polymer products for example linear low density polyethylene (LLDPE) based on copolymers of ethylene with but-1-ene, 4-methylpent-1-ene or hex-1-ene and high density polyethylene (HDPE) which can be for example copolymers of ethylene with a small portion, of higher alpha olefin, for example, but-1-ene, pent-1-ene, hex-1-ene or 4-methylpent-1-ene.

The process is particularly suitable for polymerising olefins at an absolute pressure of between 0.5 and 6 MPa and at a temperature of between 30° C. and 130° C. For example for LLDPE production the temperature is suitably in the range 75–95° C. and for HDPE the temperature is typically 80–112° C. depending on the activity of the catalyst used and the polymer properties desired.

The polymerisation is preferably carried out continuously in a vertical fluidised bed reactor according to techniques known in themselves and in equipment such as that described in French Patent Application 0004757 (filing number), European patent application EP-0 855 411, French Patent No. 2,207,145 or French Patent No. 2,335,526. The process of the invention is particularly well suited to industrial-scale reactors of very large size.

In one embodiment the reactor used in the present invention is capable of producing greater than 300 kg/h to about 80,000 kg/h or higher of polymer, preferably greater than 10,000 kg/h.

The polymerisation reaction is carried out in the presence of a Ziegler-Natta type catalyst.

Examples of Ziegler-Natta type catalysts according to the present invention are typically those consisting of a solid catalyst essentially comprising a compound of a transition metal and of a cocatalyst comprising an organic compound of a metal (i.e. an organometallic compound, for example an alkylaluminium compound). These high-activity Ziegler-Natta type catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of transition metal complexes, magnesium complexes and halogen containing complexes. Examples thereof can be found, e.g. in U.S. Pat. No. 4,260,709, EP0598094, EP0099774 and EP0175532. The process is also particularly suitable for use with Ziegler catalysts supported on silica, e.g. in WO9309147, WO9513873, WO9534380, WO9905187 and EP-99430020.0 application filed on Sep. 17, 1999. For the purpose of the present description and appended claims, Ziegler-Natta type catalysts specifically exclude the metallocene catalysts.

According to a preferred embodiment of the present invention the Ziegler-Natta type catalyst consists of a catalyst precursor and of a cocatalyst, said catalyst precursor comprising a catalyst carrier material, an alkylmagnesium compound, a transition metal compound of Groups 4 or 5 of the Periodic table of the elements, and an optional electron donor.

The catalyst carrier material which can be used in the present invention are solid, porous carrier materials such as e.g. silica, alumina and combinations thereof. They are preferably amorphous in form. These carriers may be in the form of particles having a particle size of from about 0.1 micron to about 250 microns, preferably from 10 to about 200 microns, and most preferably from about 10 to about 80 microns. The preferred carrier is silica, preferably silica in the form of spherical particles e.g. spray dried silica.

The internal porosity of these carriers may be larger than 0.2 cm$^3$/g, e.g. larger than about 0.6 cm$^3$/g. The specific surface area of these carriers is preferably at least 3 m$^2$/g, preferably at least about 50 m$^2$/g, and more preferably from, e.g. about 150 to about 1500 m$^2$/g. It is desirable to remove physically bound water from the carrier material prior to contacting this material with water-reactive magnesium compounds. This water removal may be accomplished by heating the carrier material to a temperature from about 100° C. to an upper limit of temperature represented by the temperature at which change of state or sintering occurs. A suitable range of temperatures may, thus, be from about 100° C. to about 850° C. Preferably, said temperature is comprised between 500° C. and 800° C.

Silanol groups represented by a presence of Si—OH groups in the carrier are present when the carrier is contacted with water-reactive magnesium compounds in accordance with the present invention. These Si—OH groups are usually present at about 0.3 to about 1.2 mmoles of OH groups per gram of carrier, preferably at about 0.3 to about 0.7 mmoles of OH groups per gram of carrier. Excess OH groups present in the carrier may be removed by heating the carrier for a sufficient time at a sufficient temperature to accomplish the desired removal. For example, the silica carrier, prior to the use thereof in the first catalyst synthesis step has been dehydrated by fluidising it with nitrogen or air and heating at least at about 600° C. for at least about 5 hours to achieve a surface hydroxyl group concentration of less than about 0.7 mmoles per gram (mmoles/g).

The surface hydroxyl concentration (OH) of silica may be determined according to J. B. Peri and A. L. Hensley, Jr., J. Phys. Chem., 72(8), 2926 (1968). The silica of the most preferred embodiment is a material marketed under the tradename of ES70 by Crosfield and having a surface area of 280 $m^2/g$ and a pore volume of 1.6 ml/g. Another preferred silica is a high surface area, amorphous silica (surface area=300 $m^2/g$ ; pore volume of 1.65 $cm^3/g$), and it is a material marketed under the tradename of Davison 952 by the Davison Chemical Division of W. R. Grace and Company.

The alkylmagnesium compound is preferably a dialkylmagnesium having the empirical formula $RMgR^1$ where R and $R^1$ are the same or different $C_2$–$C_{12}$ alkyl groups, preferably $C_2$–$C_8$ alkyl groups, more preferably $C_4$–$C_8$ alkyl groups, and most preferably both R and $R^1$ are butyl groups. Butylethylmagnesium, butyloctylmagnesium and dibutylmagnesium are preferably used according to the present invention, dibutylmagnesium being the most preferred.

The transition metal compound is preferably a titanium compound, preferably a tetravalent titanium compound. The most preferred titanium compound is titanium tetrachloride. Mixtures of such titanium metal compounds may also be used.

The optional electron donor is preferably a silane compound, more preferably a tetraalkyl orthosilicate having the formula $Si(OR)_4$ wherein R is preferably a $C_1$–$C_6$ alkyl compound. Typical examples of tetraalkyl orthosilicate include tetramethoxysilane, tetraethoxysilane, tetraisopropoxysilane, tetrapropoxysilane, tetrabutoxysilane, tetraethoxysilane and tetrabutoxysilane being the two most preferred ones.

The cocatalyst which can be used is preferably an organometallic compound of a metal from groups I to III of the Periodic Classification of the Elements, such as, for example, an organoaluminum compound, e.g. dimethylaluminiumchloride, trimethylaluminium, triisobutylaluminium or triethylaluminium. Triethylaluminium is preferably used.

The catalyst can be used as it is or optionally in the form of a coated catalyst or prepolymer containing, for example, from $10^{-5}$ to 3, preferably from $10^{-3}$ to $10^{-1}$, millimoles of titanium per gram of polymer. The process of the invention is particularly suited to the use of a non-prepolymerized catalyst, preferably to the direct introduction of a titanium magnesium silica supported catalyst.

The additive of the present invention is preferably added to the reactor in an amount such that the resulting catalyst activity (gram of polymer per gram of transition metal per hour) presents an increase of at least 30%, preferably at least 50%, more preferably at least 80%, when compared with exactly the same process conditions in the absence of said additive.

According to a preferred embodiment of the present invention, the additive is added to the reactor in an amount comprised between 0.1 to 40 moles of additive per mole of transition metal of catalyst introduced into the reactor, preferably in a mole ratio comprised between 0.2 and 40, preferably 0.2 and 10, more preferably 0.25 and 5. Said mole ratio or mole of additive per mole of transition metal catalyst can be measured by any appropriate method; for example, it can be measured through the measurement of the transition metal content of the polymer powder.

The additive can be added continuously or intermittently to the reactor. In the continuous gas phase polymerisation process according to the present invention, it is preferred to add continuously the additive to the reactor. Sufficient additive is added to maintain its concentration at the desired level.

The following non limiting examples illustrate the present invention.

EXAMPLES a. Catalyst Preparation

The catalyst is a silica supported catalyst which is the same as one disclosed in the comparative example 1 of WO99/05187 (1 mmol DBM/g silica, 0.44 mmol TEOS/g silica, 1 mmol $TiCl_4$/g silica)

Example C.1

Manufacture of a Copolymer of Ethylene and 1-Hexene

The operation was carried out in a stirred gas phase polymerisation reactor. The volume of that autoclave is 2.5 L. A seed bed was added to the reactor prior to composition of the gas phase and the heating to reaction temperature. The reaction gas phase composition consist of 0.4 MPa of ethylene, 0.145 MPa of hydrogen and 0.073 MPa of hexene.

The polymerisation temperature is fixed at 85° C. Following injection of the catalyst a, the gas phase composition was monitored by mass spectrometry with comonomer and hydrogen being added to maintain constant $C_6/C_2$ and $H_2/C_2$ ratios.

Under this conditions an ethylene-hexene copolymer was obtained with the density of 0.9158 $g/cm^3$ and a $MI_{2.16}$ of 2.9 g/10 minutes. The catalyst activity was 2700 g of polymer per mmol of titanium per hour of reaction and per MPa of ethylene pressure.

Example 2

Manufacture of a Copolymer of Ethylene and 1-Hexene

The operation was carried in a similar way as in example C.1 with the same catalyst a. A slight difference in the gas phase composition occurred. The pressure of hydrogen was fixed to 0.166 MPa and the hexene one to 0.063 MPa. Moreover, before the catalyst injection, a n-BuCl was injected in the reactor, leading to the molar ratio of n-BuCl/Ti equal to 17.5.

Under these conditions the obtained polymer has a density of 0.917 $g/cm^3$ and a $MI_{2.16}$ of 3.4 g/10 minutes. The catalyst activity was 5700 g of polymer per mmol of titanium per hour of reaction and per MPa of ethylene pressure.

b. Catalyst Preparation

12 Kg of Crosfield ES70 silica, which had been heated to 700° C. for about 5 hours under a dry nitrogen purge, was slurried in hexane contained in a 140 L pilot plant reactor kept under a continuous nitrogen purge and equipped with a stirrer.

The slurry was stirred at 166 rpm and heated to 50° C., then 29.6 L of dibutyl magnesium (DBM, 0.812 M) were added dropwise to the slurry, and the mixture stirred for 1 hour.

Next, 100 L of hexane were added at the same temperature and the mixture stirred again during ¼ h and settled (½ h) before removing 122 L of the supernatant solution.

Three washings each with 130 L of fresh solvent were performed in the same conditions.

Then 20 L of hexane were introduced with dehydrated TBOS solution (4.31, 2.8 M), and the mixture stirred for 2 h Finally, 2.1 L of pure TiCL4 were added dropwise, and the stirring was continued for an additional hour at 50° C.

A detailed catalyst characterisation is described in the example 1 of EP-99430020.0 application filed on 17.09.1999.

Example 3

Manufacture of a Copolymer of Ethylene and 1-Hexene

Few copolymerisations were performed, as previously described, in the stirred gas phase polymerisation reactor. A seed bed was also added to the reactor prior to composition of the gas phase and heating to reaction temperature. The reaction gas phase composition consist of 0.4 MPa of ethylene, 0.15 MPa of hydrogen and about 0.06 MPa of hexene. The reactor was fed with different amounts of butyl choride prior the catalyst b injection. The precise polymerisation conditions, the different molar ratio of butyl chloride to titanium, as well as the product density and activity are summarised in the following table. A comparative sample without n-BuCl injection is also listed in the table.

| Run | molar ratio n-BuCl/Ti | $pC_6$ MPa | flow ratio during polymerisation hexene/ethylene | d $g/cm^3$ | Activity g/mmol · h · MPa |
| --- | --- | --- | --- | --- | --- |
| Comp. A | 0 | 0.062 | 0.157 | 0.9192 | 1420 |
| B | 2.5 | 0.062 | 0.153 | 0.9172 | 3220 |
| C | 4.7 | 0.061 | 0.16 | 0.9167 | 3250 |
| D | 9.8 | 0.055 | 0.151 | 0.9164 | 3240 |

The analysis of the runs disclosed in the table shows that the catalyst activity in runs B, C and D was considerably increased in comparison with Run A (comparative) wherein no butyl chloride was used. Furthermore, the presence of n-BuCl in the polymerisation reactor improves the comonomer response as indicated by the density values.

Example 4

Manufacture of Homopolyethylene

A same catalyst as the one disclosed in the example a is used in this example.

Few homopolymerisations were performed, as previously described, in the stirred gas phase polymerisation reactor. The reaction gas phase composition consist of about 0.5 MPa of ethylene, 0.2 MPa of hydrogen. The reactor was fed with different amount of butyl cholide prior the catalyst injection. The precise polymerisation conditions, the different molar ratio of butyl chloride to titanium and activity are summarised in the following table. A comparative sample without n-BuCl injection is also listed in the table.

| Run | $P_{ethylene}$ Mpa | $P_{hydrogen}$ MPa | molar ratio of butyl chloride to titanium n-BuCl/Ti | Activity g/mmol · h · MPa |
| --- | --- | --- | --- | --- |
| Comp. A | 0.5 | 0.2 | 0 | 850 |
| B | 0.5 | 0.2 | 0.5 | 1500 |
| C | 0.46 | 0.2 | 5 | 2900 |

The analysis of the runs disclosed in the table shows that the catalyst activity in runs B and C was considerably increased in comparison with Run A (comparative) wherein no butyl chloride was used.

What is claimed is:

1. A process for the gas-phase copolymerization of ethylene with a comonomer, comprising copolymerizing ethylene with a comonomer selected from the group consisting of but-1-lene, pent-1-ene, 1, 4-methylpent-1-lene and oct-1-ene in a fluidized bed reactor using a Ziegler-Natta catalyst containing a transition metal, said process being performed in the presence of an at least one additive selected from the group consisting of ethyl chloride, propyl chloride, butyl chloride, pentyl chloride, hexyl chloride and heptyl chloride and said additive being added to the reactor an amount of from 0.2 to 40 moles per mole of transition metal in the catalyst in the reactor.

2. The process of claim 1, wherein the additive is n-butyl chloride.

3. The process of claim 1, wherein the additive is diluted in a diluent in an amount of from 0.001 to 2 moles of additive per 1 of diluent.

4. The process of claim 3, wherein the diluent is butane, pentane, or hexane.

5. The process of claim 1, wherein the additive is added to the reactor in an amount of from 0.2 to 10 moles of additive per mole of transition metal in the catalyst in the reactor.

6. The process of claim 5, wherein the amount is 0.25 not 5 moles of additive per mole of transition metal.

7. The process of claim 1, wherein the additive is not added in admixture with the catalyst.

\* \* \* \* \*